United States Patent [19]
Behar et al.

[11] 3,916,728
[45] Nov. 4, 1975

[54] INTER-AXLE DIFFERENTIAL LOCK

[75] Inventors: Marcel N. Behar, Southfield; Timothy J. Morscheck, Warren, both of Mich.

[73] Assignee: Eaton Corporation, Cleveland, Ohio

[22] Filed: June 12, 1973

[21] Appl. No.: 369,355

[52] U.S. Cl. .................................. 74/711; 74/711
[51] Int. Cl.² .......................................... F16H 1/44
[58] Field of Search ............ 74/711, 710.5, 713, 64; 192/103 C, 35

[56] References Cited
UNITED STATES PATENTS

| | | | |
|---|---|---|---|
| 2,884,808 | 5/1959 | Mueller | 74/710.5 X |
| 3,089,349 | 5/1963 | Thornton | 74/710.5 |
| 3,265,173 | 8/1966 | Russell | 74/710.5 X |
| 3,396,609 | 8/1968 | Stockton | 74/711 |
| 3,437,186 | 4/1969 | Roper | 74/711 X |
| 3,452,619 | 7/1969 | Roper | 74/711 |
| 3,489,038 | 1/1970 | Roper | 74/710.5 |
| 3,584,713 | 6/1971 | Tani et al. | 192/103 C X |
| 3,606,803 | 9/1971 | Ottemann | 74/711 |
| 3,762,241 | 10/1973 | Roper | 74/711 |

FOREIGN PATENTS OR APPLICATIONS

| | | | |
|---|---|---|---|
| 140,691 | 10/1960 | U.S.S.R. | 74/711 |

*Primary Examiner*—Samuel Scott
*Assistant Examiner*—Lance W. Chandler
*Attorney, Agent, or Firm*—Teagno & Toddy

[57] ABSTRACT

An inter-axle differential lock for a tandem drive axle vehicle. The differential is of the side gear type having an input shaft splined to a spider assembly which drives the side gear pinions or planet gears, a first output side gear or driven gear which is journaled on the input shaft, and a second output side gear or driven gear which is axially aligned with the input shaft. The input shaft also carries a positive clutch which locks the first output gear to the input shaft when an acceleration responsive clutch actuator senses a relative acceleration, above a predetermined level, between the input shaft and the first output gear. The clutch actuator is carried by the first output gear and has a drive shaft which drives a flywheel assembly. The actuator drive shaft has a pinion at one end which is in mesh with gear teeth formed on the outer periphery of one of the members of the positive clutch.

16 Claims, 5 Drawing Figures

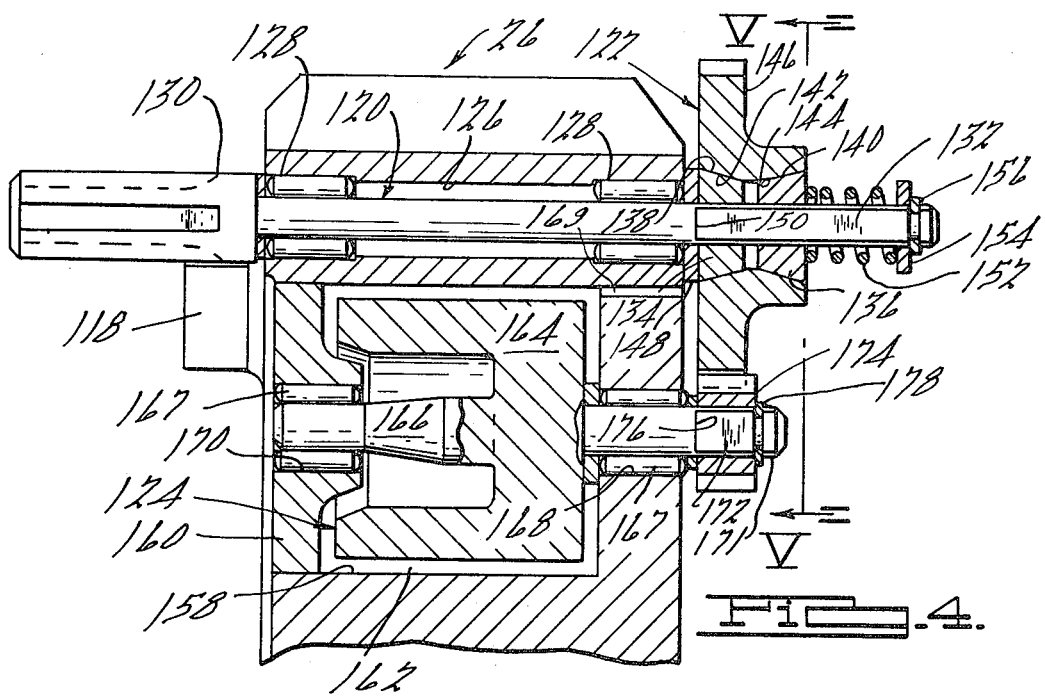

INTER-AXLE DIFFERENTIAL LOCK

FIELD OF THE INVENTION

This invention relates to differentials and, particularly, to automatic lock mechanisms for differentials.

BACKGROUND OF THE INVENTION

Prior art lock mechanisms to prevent excessive relative rotational wheel speeds between the wheels driven by a differential have been of two basic types, manually controlled mechanisms and automatically controlled mechanisms. The manually controlled mechanisms are usually employed in, but not limited to, heavy trucks and usually require a positive type clutch due to high torque loads; this type of mechanism is engaged at the discretion of the vehicle operator before the vehicle is placed in motion. The automatically controlled mechanisms are usually employed in light vehicles, such as passenger cars or pickup trucks, and usually have a friction type clutch. The clutch is automatically engaged in response, typically, to the level of relative rotation between two members of the differential or, as in one known prior art mechanism, in response to the level of acceleration of one of the members. Examples of the relative rotation responsive mechanisms are disclosed in U.S. Pat. Nos. 3,437,186 entitled "Speed Responsive Clutch" and 3,606,803 entitled "Centrifugal Actuator for Limited Slip Differential," both assigned to the assignee of the invention. The one known prior art mechanism of the acceleration responsive type is disclosed in U.S. Pat. No. 2,431,272 entitled "Self-Locking Equalizing Drive."

Manually controlled mechanisms with positive type clutches are satisfactory in that the positive clutch is capable of preventing relative rotation between the differential members even under high torques; however, these mechanisms require the attention of the vehicle operator and, if inadvertently left engaged, may accelerate tire wear and cause vehicle instability on slippery roads or damage to the differential or axle assembly on dry roads during normal turning.

Automatically controlled mechanisms of the relative rotation responsive type operate satisfactorily with friction type clutches in light vehicles; however, since this type of mechanism responds to engage the clutch when the relative rotation exceeds a predetermined level, the use of a positive type clutch in combination with a relative rotation responsive mechanism would be impractical due to high shock loads upon engagement of the clutch.

The acceleration responsive mechanism disclosed in U.S. Pat. No. 2,431,272 is basically a mass of predetermined moment of inertia which is threaded to an output shaft of a differential. Angular acceleration of the mass is responsive to angular acceleration of the shaft and the angular acceleration of the mass is limited by the frictional forces at the thread interface of the mass and the shaft. This type of arrangement is responsive to acceleration of the shaft and not relative acceleration between members of the differential. Furthermore, levels of angular acceleration of the shaft, even though they may be due to a slipping wheel, may be too low to produce a force exceeding the frictional force between the thread interface of the mass and the shaft. When this phenomena occurs the mass will not be displaced axially on the threads and the clutch will not engage, even though the wheel on the shaft is slipping and accelerating to a spin level which prevents effective driving torque being applied to the non-slipping wheel.

SUMMARY

A primary objective of the present invention is to provide an automatic lock mechanism for a differential which overcomes the noted disadvantages of the prior art units.

A more specific object of the invention is to provide an automatic lock mechanism which is more durable, efficient and reliable than prior art units.

A more specific object is to provide an automatic lock mechanism which is more responsive to incipient wheel spin than prior art units.

A still more specific object is to provide an automatic lock mechanism which is more responsive to low levels of incipient relative rotation between two members of the differential.

A still more specific object is to provide an automatic lock mechanism which is less susceptible to parasitic drag.

The differential of the present invention is of the type including an input member, two output members, a clutch, and an actuator assembly which operates in response to relative acceleration between the differential members to move the clutch to a position which restricts relative rotation between the differential members. According to an important feature of the invention, the actuator assembly includes a shaft journaled in one of the differential members and driven from another of the differential members, an a mass driven by the shaft and mounted for rotation in the one differential member about an axis spaced from the shaft axis. This construction allows optimization of the journaling arrangement of the mass and allows isolation of the mass bearing loads from the shaft.

According to another feature of the invention, the driving connection to the shaft is arranged to rotate the shaft faster than the relative rotation between the members of the differential, and the gear connection between the shaft and the mass is arranged to rotate the mass still faster than the shaft, whereby a low relative acceleration will be amplified and applied to the mass to produce a force sufficient to actuate the clutch.

According to another feature of the invention the mass is enclosed in a chamber in the carrying differential member and is journaled at both ends in antifriction bearings to minimize the effects of parasitic drag on the mass as the rotational speed of the mass and the carrying member increases.

According to another feature of the invention the gear connection between the mass and the shaft includes a torque limiting clutch which limits the magnitude of reverse force generated by the mass upon engagement of the clutch.

BRIEF DESCRIPTION OF THE DRAWINGS

In the drawings:

FIGS. 3 and 4 are cross-sectional views taken on lines III—III and IV—IV, respectively, of FIG. 2;

FIG. 5 is a cross-sectional view taken on line V—V of FIG. 4.

DESCRIPTION OF THE PREFERRED EMBODIMENT

Figure 1:
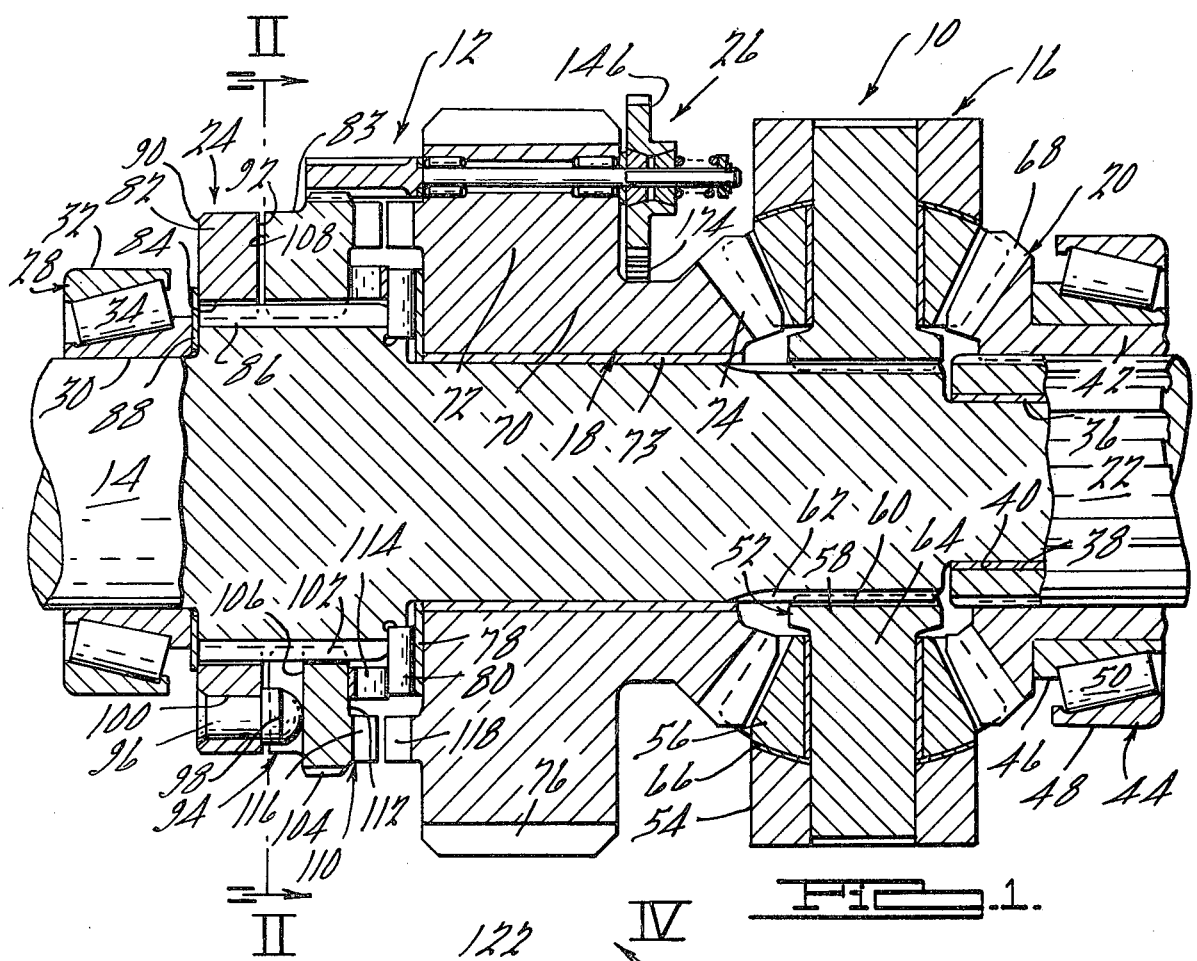
FIG. 1 is a cross-sectional view of an inter-axle differential provided with a lock mechanism according to the invention.

FIG. 1 illustrates an inter-axle differential 10 having a lock mechanism 12. Although differential 10 is intended primarily for use in a heavy truck having tandem drive axles, the invention lock mechanism is not limited to use in heavy trucks or in combination with inter-axle differentials. Broadly considered, differential 10 includes an input shaft 14, a spider assembly 16, driven members 18 and 20, and an output shaft 22. Lock mechanism 12 includes a positive type clutch assembly 24 and an acceleration responsive actuator assembly 26.

Input shaft 14 is supported for rotation at its forward end by a tapered roller bearing 28 having inner and outer races 30, 32 and a plurality of rollers 34. Bearing 28 may be supported in a housing assembly (not shown) in a well-known manner; the rearward end of input shaft 14 is supported within a sleeve bearing 36. Sleeve bearing 36 is positioned in an axial pilot bore 38 in the forward end of output shaft 22 and receives a necked down pilot portion 40 on the rearward end of input shaft 14. The forward end of output shaft 22 is splined to an axially extending cylindrical portion 42 of driven member 20. Support for driven member 20 and output shaft 22 is provided by a tapered roller bearing 44 having inner and outer races 46, 48 and a plurality of rollers 50. Bearing 44 may be supported in a housing assembly (not shown) in a well-known manner.

Spider assembly 16 includes a spider 52, a collar 54, and four beveled pinions 56 of which two are shown. Spider 52 has a hub portion 58 with a plurality of splines 60 which mate with a plurality of splines 62 formed on input shaft 14 and four radially extending pinion shafts 64 formed integrally with the hub. Two of the pinion shafts are shown. Pinions 56 are journaled on the pinion shafts and restrained from radially outward movement by collar 54. Collar 54 is composed of two rings which are bolted together in a conventional manner, (not shown). A thrust washer 66 is interposed between each pinion 56 and the collar.

Driven member 20 includes a beveled side gear portion 68 which is in constant mesh with pinions 56. Driven member 18 is a double gear and includes a hub portion 70 and a radially extending annular portion 72. Hub portion 70 is journaled on output shaft 14 via a sleeve bearing 73. A beveled side gear portion 74 is formed on the rearward end of hub portion 70. Beveled side gear 74 is in constant mesh with pinions 56. A spur gear on helical gear portion 76 is formed on the outer periphery of annular portion 72. A thrust washer 78 and a spacer 80 provide means for counteracting axial thrust imposed on driven member 20 and means for axially positioning the teeth of bevel gear 74 relative to the teeth of pinion 56.

Positive clutch assembly 24 includes a fixed annular member 82 and a movable annular member 83. A plurality of splines 84 formed on the inner circumference of annular member 82 are press-fitted over a plurality of mating splines 86 formed on input shaft 14. A washer 88, interposed between inner race 30 of bearing 28 and the forward end face 90 of annular member 82, provides an axial support to prevent forward movement of the annular member should the mating splines loosen. The rearward end face 92 of annular member 82 is provided with three rivet-like elements 94 each of which has a shank 96 and a button head 98. Shanks 96 are press-fitted into holes 100, which are spaced 120 degrees apart in the annular member.

Figure 2:
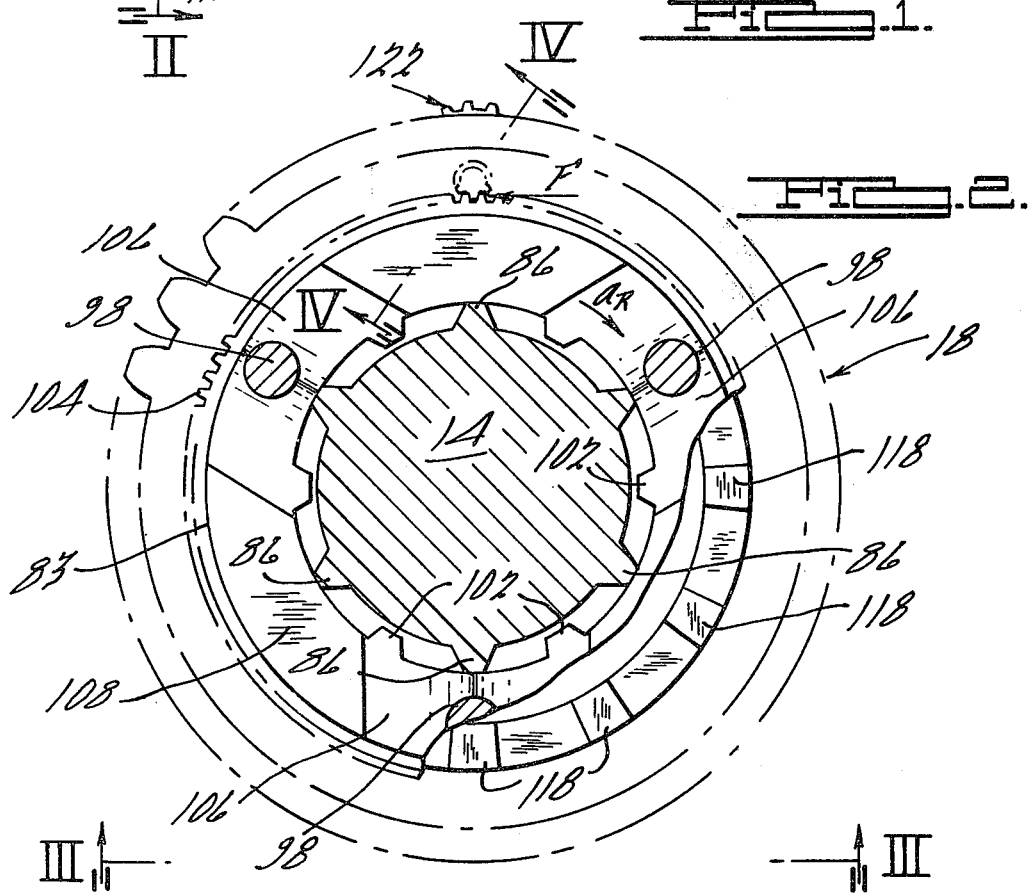
FIG. 2 is a cross-sectional view taken on line II—II of FIG. 1.

Referring now to FIG.'s. 1–3, movable member 83 includes a plurality of splines 102 formed on its inner circumference, a set of gear teeth 104 formed on its outer circumference, three vee-ramped depressions 106 formed in its forward end face 108, and an annular set of axially extending clutch teeth 110 projecting from its rear end face 112. Splines 102 are loosely received by splines 86 on input shaft 14 in a manner allowing axial and limited angular movement of annular member 83 relative to the input shaft, as best seen in FIG. 2. An annular wave spring 114, interposed between spacer 80 and rear end face 112, biases ramped depressions 106 into engagement with button heads 98. The axially extending cross section of each tooth of clutch teeth 110 is substantially a truncated sector of a circle defined at its radially inward and outward extents by concentric circles. Clutch teeth 110 are axially aligned and spaced from a similar mating annular set of axially extending clutch teeth 118 which are formed on the forward end face of annular portion 72. Button heads 98 coact with vee-ramped depressions 106 to provide a camming device to move clutch teeth 110 into engagement with clutch teeth 118 in response to angular phase changes between movable member 83 and input shaft 14.

Acceleration responsive actuator 26 is best seen in FIG. 4 and includes a drive shaft 120, a torque limiting clutch assembly 122 and a bob weight assembly 124. Drive shaft 120 is journaled in a bore 126 in annular portion 72 by a pair of needle bearing assemblies 128. A pinion 130 is formed on the forward end of shaft 120. Pinion 130 is in constant mesh with gear teeth 104 of annular member 83, as may be seen in FIG. 1. The portion of shaft 120 extending rearwardly beyond bore 126 has a flat 132 machined thereon, thereby giving the shaft somewhat of a "D" cross-sectional shape, as best seen in FIG. 5.

Torque limiting clutch assembly 122 is a double cone clutch having a pair of annular members 134, 136 defining on their outer periphery a pair of frusto-conical friction surfaces 138, 140 which mate with a pair of frusto-conical friction surfaces 142, 144 defined on the inner periphery of a gear 146. A thrust washer 148 having a D-shaped central opening fits snugly on the "D" shape of shaft 120 and rests against a shoulder 150, defined by the terminus of flat 132, to prevent axial movement of clutch assembly 122 in the forward direction. A D-shaped central opening in members 134, 136 provides means for freely sliding the members over the D-shaped portion of shaft 120 while preventing angular movement of the members relative to the shaft. Frusto-conical friction surface 138, 140 and 142, 144 are biased together by a helical spring 152 which is interposed between the rear end face of member 136 and a thrust washer 154. Axial movement of thrust washer 154 in the rearward direction is prevented by a snap ring 156.

A blind bore 158 in annular portion 72 and a press-fitted cap 160 at the open end of the bore, defines a cylindrical chamber 162 for enclosing bob weight assembly 124. Bob weight assembly 124 includes a bob weight 164 of substantially U-shaped axial cross section and a shaft 166. Bob weight 164 may be formed integrally with shaft 166 or press-fitted thereon. Shaft 166 is simply supported and journaled in a pair of needle bearings 167 which are supported by axially aligned bores 168, 170 in the end walls of chamber 162. A bore 169 provides a passage for draining oil from chamber 162. An end portion 171 of shaft 162 extends rearwardly beyond bore 168 and has a flat 172 machined thereon, thereby giving the shaft a D-shaped cross section, as best seen in FIG. 5. A pinion 174 has a D-shaped central opening, which fits the D shape of shaft portion 171 to prevent rotation of the pinion relative to the shaft. Axial movement of pinion 174 relative to shaft 166 is prevented by a shoulder 176, defined by the terminus of flat 172, and a snap ring 178.

Chamber 162 constitutes an important part of the invention by providing means to minimize the generation of parasitic drag acting on bob weight 164; the diameter of shaft 166 may be minimized by simply supporting the bob weight in the end walls of the chamber, thereby minimizing bearing drag; rotating the bob weight in an environment free of viscous differential oil minimizes the viscous drag on the bob weight. Further, debris from the bob weight will be confined to the chamber in the event of failure of the bob weight.

OPERATION OF THE PREFERRED EMBODIMENT

The disclosed lock mechanism 12 is operative to lock input shaft 14 to driven member 18 when the relative acceleration between the input shaft and the driven member exceeds a predetermined level. Hence, the lock mechanism senses an incipient relative rotation between the input shaft and the driven member and locks the differential before significant levels of relative rotation occur.

The lock mechanism, as disclosed, includes positive clutch assembly 24 to lock the differential and acceleration responsive actuator assembly 26 which generates a force to engage the clutch assembly. Clutch assembly 24 is biased disengaged by spring 114 which tends to center button heads 98 in the apex of vee-ramped depressions 106, thereby tending to maintain the angular phase relationship between annular member 83 and input shaft 14. Acceleration responsive actuator assembly 26 is operative to engage the clutch by applying a force which tends to uncenter the ramped depressions 106, thereby tending to change the angular phase relationship between annular member 83 and input shaft 14. The clutch is engaged when the uncentering effect of the actuator force exceeds the effect of the spring biasing force.

The force (F) produced by actuator assembly 26 is a function of the acceleration acting on the actuator and the moment of inertia (I) of the actuator. Levels of relative acceleration which are capable of causing significant relative rotation are normally quite low. Therefore, to produce a force F great enough to engage the clutch the moment of inertia must be made large and/or the relative acceleration must be amplified; lock mechanism 12 contains means to do both. The moment of inertia of actuator assembly 26 is increased by bob weight assembly 124 and the relative acceleration acting on the actuator assembly is amplified by the ratio of gear teeth 104 and pinion 130 and the ratio of gear 146 and pinion 174.

The actuator force F is applied to annular member 83 at the mesh point of gear teeth 104 and pinion 130; this force is counter to the relative acceleration A between the input shaft and member 18, as shown in FIG. 2. Arrow A indicates a clockwise relative acceleration and arrow F the reactive force produced by the actuator.

Torque limiting clutch assembly 122 limits the magnitude of the force F produced by the actuator assembly. During some modes of operation of the differential relative acceleration levels may be great enough to cause damage to the actuator assembly. These relative accelerations may be tending to either increase or decrease the relative rotational speed between input shaft 14 and driven member 18. Relative accelerations tending to increase relative rotation is normally not great enough to generate large damaging forces. However, when the positive clutch is engaged, an instantaneous acceleration reversal occurs between the input shaft and the driven member; this reversed acceleration may be several orders of magnitude greater than the acceleration which caused the engagement of clutch assembly 24 and could generate damaging forces, were it not for the torque limiting clutch.

The preferred embodiment of the invention has been disclosed for illustrative purposes. The following claims are intended to cover the inventive portions of the preferred embodiment and variations or modification within the spirit of the invention.

What is claimed is:

1. An improved lock mechanism for a differential gear device of the type having an input member rotatively driven by an input shaft and two output members rotatively driven by said input member, said lock mechanism comprising:
    A. a shaft journaled in one of said differential members;
    B. a mass of predetermined moment of inertia
        1. mounted for rotation in said one differential gear member, and
        2. journaled for rotation about an axis spaced from said journaled shaft;
    C. first drive means connecting said journaled shaft to said mass;
    D. second drive means connecting said journaled shaft to another of said differential gear members so that said shaft and mass are rotated in response to relative rotation between said one differential gear member and said other differential gear member and a force is generated by said shaft and mass in response to relative acceleration between said one differential gear member and said other differential gear member; and
    E. means responsive to said force to restrict differential rotation of said differential gear members.

2. The lock mechanism of claim 1 wherein:
    F. said first drive means includes a torque limiting clutch interposed between said journaled shaft and said mass.

3. The lock mechanism of claim 1 wherein:
    F. said first drive means includes
        1. a drive gear secured to said journaled shaft, and
        2. a pinion secured to said mass, thereby defining an amplifying gear ratio for rotating said journaled mass faster than said journaled shaft.

4. The lock mechanism of claim 1 wherein:
    F. said one differential gear member includes a chamber for enclosing said mass.

5. The lock mechanism of claim 4 wherein:
    G. said chamber includes an end wall having a bore therethrough;
    H. said mass includes a shaft portion fixed to said mass and extending through said end wall bore; and
    I. said first drive means includes
        1. a pinion secured to said shaft portion, and 2. a drive gear secured to said journaled shaft and in mesh with said pinion.

6. The lock mechanism of claim 5 wherein:
J. said first drive means includes a torque limiting means interposed between said journaled shaft and said mass.

7. The lock mechanism of claim 6 wherein:
K. said torque limiting means is a torque limiting clutch interposed between said journaled shaft and said drive gear.

8. A differential gear assembly comprising:
A. an input shaft;
B. an input member rotatively driven by said input shaft;
C. two output gears rotatively driven by said input member, one of said driven gears being journaled on said input shaft and having
  1. a bore substantially parallel to and spaced radially outward from the rotational axis of said one driven member, and
  2. a chamber spaced radially outward from the rotational axis of said one driven member;
D. a substantially annular clutch member
  1. mounted on said input shaft in confronting relation to said one driven member in a manner allowing axial and limited angular movement relative to said input shaft, and
  2. having gear teeth formed on the exterior periphery thereof;
E. means biasing said clutch member away from said one driven member;
F. means operative in response to angular movement of said clutch member relative to said input shaft to move said clutch member along said input shaft to engage said clutch member with said one driven member, thereby clutching said input shaft to said one driven member; and
G. an actuator assembly including
  1. a shaft journaled in said bore,
  2. a mass of predetermined moment of inertia mounted for rotation in said chamber,
  3. drive means connecting said mass to said journaled shaft, and
  4. a pinion on said journaled shaft and in mesh with said clutch member gear teeth, whereby said journaled shaft and mass are rotated about their rotational axis in response to a predetermined rotational relationship between said input shaft and said one driven gear.

9. The differential gear assembly of claim 8 wherein:
H. said chamber is spaced radially inward from said bore.

10. The differential gear assembly of claim 8 wherein:
H. said chamber defines an end wall having a bore therein;
I. said mass includes a shaft portion fixed thereto and projecting through said end wall bore; and
J. said drive means includes
  1. a drive gear secured to rotate with said journaled shaft, and
  2. a driven gear secured to said shaft portion.

11. The differential gear assembly of claim 8 wherein:
H. said chamber is a cylindrical chamber having
  1. an axis substantially parallel to the axis of said bore, and
  2. end walls with axially aligned bores therein;
I. said mass includes a simply supported shaft portion mounted for rotation in said axially aligned bores; and
J. said drive means includes
  1. a drive gear secured to said journaled shaft, and
  2. a driven gear secured to said shaft portion.

12. The differential gear assembly of claim 11 wherein:
K. said drive means includes torque limiting clutch.

13. The differential gear assembly of claim 11 wherein:
K. said drive means includes
  1. a drive gear secured to said journaled shaft, and
  2. a pinion secured to said shaft portion.

14. The differential gear assembly of claim 13 wherein:
L. said drive means includes a torque limiting clutch which coacts with said drive gear to secure said drive gear to said journaled shaft.

15. The differential gear assembly of claim 14 wherein:
M. the inner periphery of said drive gear defines a frusto-conical surface; and
N. said torque limiting clutch includes
  1. an annular member secured to rotate with said journaled shaft and having an outer peripheral surface defining a frusto-conical surface, and
  2. means biasing said conical surfaces into frictional engagement.

16. The differential gear assembly of claim 14 wherein:
M. the inner periphery of said drive gear defines a pair of radially outwardly diverging frusto-conical surfaces; and
N. said torque limiting clutch includes
  1. a pair of annular members secured to rotate with said journaled shaft and each having an outer peripheral surface defining a frusto-conical surface positioned mate with one of said radially outwardly diverging conical surfaces,
  2. means preventing axial movement of one of said pair of annular members in one direction, and
  3. means biasing the other of said pair of annular members toward said one annular member.

* * * * *